Oct. 13, 1964 KU SUN LING 3,153,172

AUTOMATIC BRIGHTNESS CONTROL USING A LIGHT CONDUCTING ROD AND PHOTOCELL

Filed May 10, 1961

INVENTOR.
KU SUN LING
BY L. A. Larsen
ATTORNEY 3,153,172

AUTOMATIC BRIGHTNESS CONTROL USING A LIGHT CONDUCTING ROD AND PHOTOCELL

Ku Sun Ling, Lancaster, Pa., assignor to Radio Corporation of America, a corporation of Delaware Filed May 10, 1961, Ser. No. 109,152
1 Claim. (Cl. 315—10)

This invention relates to photosensitive devices. In particular, this invention relates to photosensitive devices of the photoconductive type in which the electrical impedance of the device changes in response to exposure of the device to light.

It has been suggested to automatically vary the contrast and brightness level of a television receiver in response to changes in the ambient light level in which the television receiver is operated. These variations are to be automatic so that the brightness of the picture presented is continuously at an acceptable level and the contrast of the picture is sufficient despite changes in the ambient illumination conditions around the television receiver. Such automatic brightness and contrast control is of value when the television receiver is to be used under widely varying light levels, e.g., when the receiver is positioned adjacent to a window in which some sun light may enter. Also, this suggestion is particularly useful for portable television receivers since these receivers are likely to be operated under widely varying light levels. Details of the circuits required to perform the automatic variations of contrast and brightness levels, in accordance with the ambient light level, may be found in a co-pending application of L. P. Thomas, Jr., Serial No. 79,853, filed December 30, 1960, now Patent No. 3,096,399, granted July 2, 1963, and assigned to the assignee of this invention.

When one attempts to control the brightness and contrast of a television receiver in proportion to the ambient illumination on the cathode ray tube face, one finds that the circuitry for operating and controlling the cathode ray tube is positioned adjacent to the socket end of the cathode ray tube. Thus, the required circuit components are normally positioned near the rear of the television cabinet. Also, to properly control the brightness and contrast levels in response to the ambient light level, the controlling light level should be obtained from the light falling on the face plate of the cathode ray tube. The reason for this is that many television receivers are positioned in rooms so that the ambient light level on the sides or back of the receiver is substantially different from that on the tube face plate. Thus, these inconsistent limitations require that the light sensitive device be positioned in the rear portion of the cabinet, with the required circuity, and at the same time positioned in the front of the receiver so that the proper ambient light will fall on the light sensitive device.

It has been suggested that the ambient light from the area near the cathode ray tube face plate may be "piped" through a light conducting medium to the photoconductive device positioned in the rear of the television cabinet, and spaced from the light conducting medium. This suggestion only partially solves the problems involved since, with the known light conducting mediums, considerable light loss occurs between the end of the light conducting medium and the photosensitive surface of the photoconductive device. When considerable light loss occurs, extremely sensitive, high cost, photoconductive cells are required to efficiently operate the electrical circuitry.

It has also been suggested to position the light sensitive device near the cathode ray tube face plate, and extend wires from the light sensitive device to the required circuitry in the rear of the cabinet. This suggestion is not completely satisfactory since the long wires that are required for such an arrangement will tend to capacitively couple electrically to other portions of the circuit in a manner which will adversely affect the video signals in the receiver.

It is therefore an object of this invention to provide a new and improved photosensitive device.

It is a further object of this invention to provide a novel, low cost, photoconductive cell in which light can be directly coupled efficiently from a remote point to the photosensitive surface without any great amount of light loss occurring.

These and other objects are accomplished in accordance with this invention by providing a photoconductive cell having a photosensitive surface and a pair of electrodes all embedded in a light conductor or a light conducting medium. The light conductor may be curved, straight, or may vary in dimension from one end to the other. With the photosensitive surface embedded in the light conductor, the light from a remote area is efficiently transferred to the light sensitive photoconductive surface.

The invention will be more clearly understood by reference to the accompanying single sheet of drawings wherein.

Figures 1, 2, 3, 4, 5, 6:
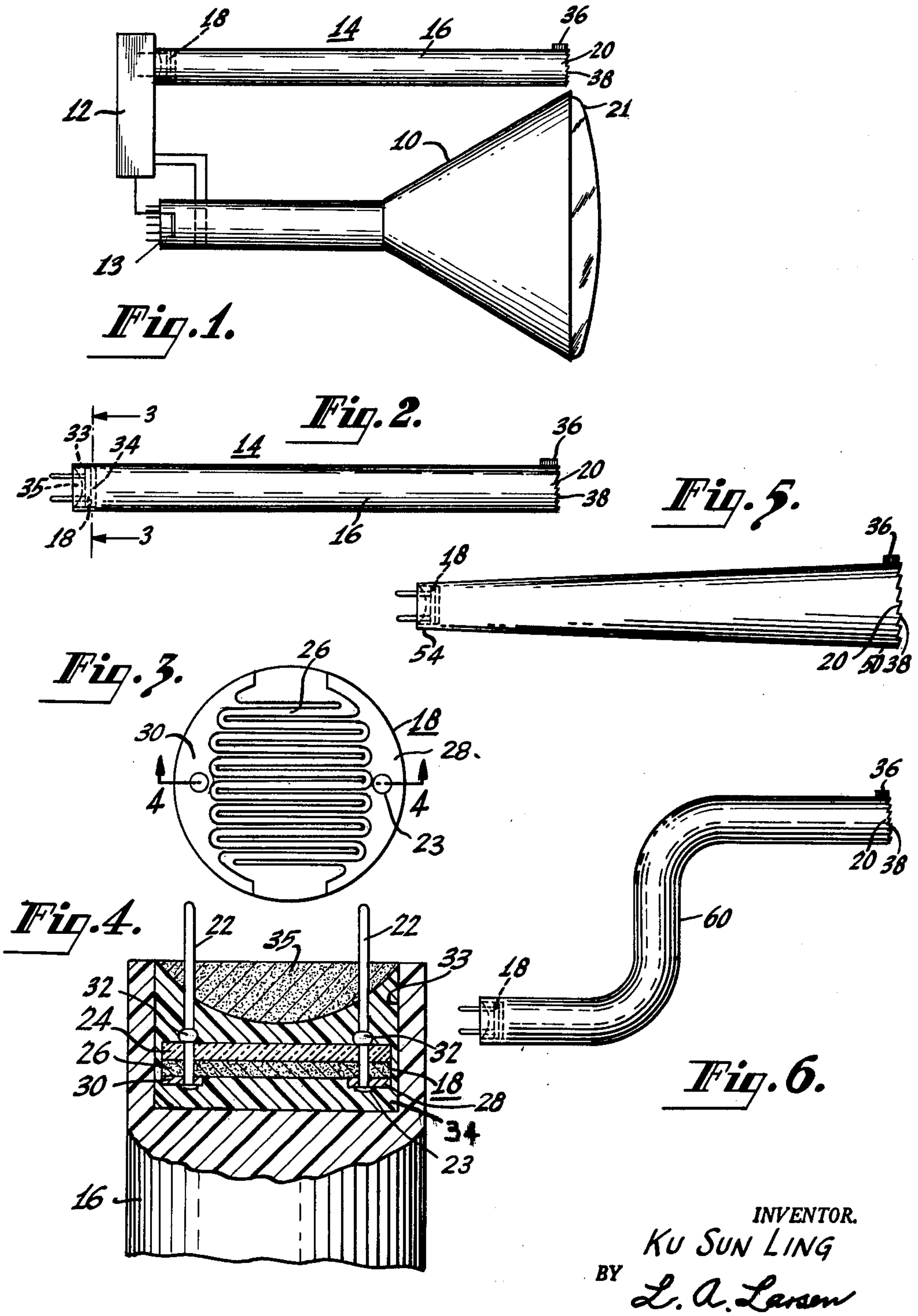
FIG. 1 is a schematic illustration of a photoconductive cell and light conducting rod, in accordance with this invention, and a cathode ray tube electrically connected together within a television receiver.
FIG. 2 is a plan view of the improved photoconductive cell and light conducting rod of this invention.
FIG. 3 is an end view of the photocell of FIG. 2 taken along line 3—3.
FIG. 4 is an enlarged sectional view of a photocell and light conducting rod in FIG. 2, taken on line 4—4 of FIG. 3.
FIGS. 5 and 6 are perspective views of other embodiments made in accordance with this invention.

Referring now to FIG. 1, portions of a television receiver are shown which include a cathode ray tube 10 having appropriate circuit components positioned in a chassis 12 located near the socket 13 of the tube 10. In the chassis 12 is included the necessary circuits and components for automatically varying the contrast and brightness levels of the picture presented on the cathode ray tube 10 in response to variations in ambient light levels. A circuit for accomplishing this automatic control is described in the above-identified Thomas application. The contrast and brightness control circuits in the chassis 12 are controlled by the ambient light level by means of a phototube 14. The phototube 14, which is shown more clearly in FIG. 2, comprises an elongated light conducting rod 16 which may be made of a material such as Lucite. Embedded in one end of the light conducting rod 16 is a sub-assembly or photoconductive cell 18. The opposite end of the elongated rod 16, which will be described subsequently, is designed for receiving ambient light from the room to activate the photocell 18.

It should be noted in FIG. 1 that the light receiving end 20 of the light conducting rod 16 is positioned substantially within the plane of the face plate 21 of the cathode ray tube 10. Thus, the light receiving end of the photocell 18 will receive the same ambient light as is presented to the cathode ray tube face plate 21. It should also be noted that the photoconductive cell 18 has relatively short lead-in wires 22 which couple directly into the chassis 12. With this arrangement, the ambient light is efficiently conducted from a region adjacent to the face plate of the cathode ray tube 10 to the photosensitive surface of the photocell 18 and the electrical signals from the photocell are connected directly into the chassis 12 without any substantial loss of light and without the use of long lead-in wires which would tend to capacitively feed spurious information into the video circuit.

Referring now to FIGS. 2, 3 and 4, the phototube 14 comprises the photoconductive cell 18 and an elongated light conducting rod 16. The light conducting rod is made of a plastic material having the property of high transmission of light in the visible light spectrum. One example of such a material is Lucite. The photoconductive cell 18 may comprise a ceramic substrate 24, for example an alumina substrate, having a layer of photoconductive material 26 thereon. The photoconductive material 26 may comprise, for example, a layer of cadmium sulfide and/or cadmium selenide. The photoconductive material may be deposited by spraying and then sintering. On the photoconductive layer 26 are two interdigitated electrodes 28 and 30, shown more clearly in FIG. 3, which may be made of a material such as tin. The electrodes 28 and 30 may be deposited by evaporation through a suitable mask. When the electrodes have been deposited, the lead-in wires 22 are assembled with enlarged ends 23 thereof in firm contact with the electrodes 28 and 30 respectively and are fixed in this position by expanding the lead-in wires beneath the ceramic substrate 24 as shown at 32. When the sub-assembly or photoconductive cell 18 shown in FIG. 3 has been completed, a silicone, or silicone gel, coating 34 is applied to the sub-assembly. The silicone coating 34 may be applied by pouring silicone to a depth of approximately ⅛ inch into the recess 33 in the light conducting rod 16. The photoconductive cell 18 is then pressed into the liquid silicone as shown in FIG. 4 and an additional layer of silicone is poured over the sub-assembly to provide a moisture penetration barrier, completely enclosing the photosensitive layer 26. The silicone coating is then cured for approximately 24 hours at a temperature of approximately 60° C. to harden the silicone.

When the photocell has been completed as described, the remaining portion of the cavity is filled with an epoxy resin 35 to give mechanical support to the lead-in wires. The epoxy resin may be cured at 60° C. for approximately four hours.

The phototube 14 also includes an indexing portion 36, on the light conducting rod or housing 16, so that the phototube 14 may be inserted from the front of a television receiver with the lead-ins 22 automatically positioned in the proper location in the rear of the receiver.

The light receiving surface 20 of the phototube 14 includes a plurality of indented or bevelled surfaces 38 which are for the purpose of gathering ambient light including light which may be at any location other than directly in front of the end of the phototube 14. These indented surfaces may be formed by injection molding the rod, in an appropriately shaped mold (not shown) with the end of the light conducting rod 16 shaped so that a "venetian blind type" surface is provided.

The light conducting rod 16 may be made into any length and diameter to fit the requirements of any particular television receiver application. In a particular model of a television receiver, a light conducting rod of approximately 13 inches in length and approximately 9/10 of an inch in diameter has been found to be suitable.

Referring now to FIG. 5, there is shown an embodiment of this invention wherein the light receiving end 50 is substantially larger than the photosensitive end of a light conducting rod 54. This embodiment of the invention will increase the amount of light incident on the photosensitive surface and thus increase the electrical output of the photocell.

The light conducting rod can also be made in the shape of a lens (not shown) with the photoconductive substrate embedded in the light conducting rod at the focal point of the lens. This too will increase the current output of the cell, for a given light level, since it will increase the light concentration on the photoconductive surface.

Referring now to FIG. 6, there is shown an embodiment of this invention wherein the light conducting rod 60 is curved. This device may be used in applications wherein the space requirements are such that the photocell can not be placed in line directly with the light source.

It should be noted that in all of the embodiments of this invention, the photocell is positioned closely adjacent to the circuitry required for controlling the brightness and contrast levels. Thus, short lead-in wires are used which eliminates adverse electrical coupling problems. At the same time, the light receiving area of the photocell is adjacent to the cathode ray tube face plate so that accurate ambient light levels are measured. When utilizing a photocell in accordance with this invention, light loss between the light receiving end and the light sensitive end of the photocell is substantially eliminated, since the photosurface is embedded in the light conducting medium.

What is claimed is:

In a display system the combination of a cathode ray tube having a face plate at one end positioned in a region having a predetermined light level and a socket at the opposite end, circuit elements connected to said cathode ray tube and disposed at a location remote from said face plate and near said socket for varying the contrast and brightness levels of said cathode ray tube, and an elongated device having opposite end portions, said device including a photocell embedded in one of said end portions only, said one of said end portions being adjacent to said location, said photocell being connected to said circuit elements, the other of said end portions being disposed adjacent to said face plate for receiving light at the level of the ambient of said face plate, the portion of said device intermediate said end portions being light conductive, whereby said circuit elements are adapted to be controlled by said light level to cause the display of said face plate to possess a brightness and contrast determined by the ambient light of said face plate.

References Cited in the file of this patent

UNITED STATES PATENTS

| | | |
|---|---|---|
| 2,268,498 | Bryce | Dec. 30, 1941 |
| 2,310,671 | Batchelor | Feb. 9, 1943 |
| 2,360,663 | Eddy | Oct. 17, 1944 |
| 2,420,716 | Morton | May 20, 1947 |
| 2,428,975 | Lamb | Oct. 14, 1947 |
| 2,804,550 | Artzt | Aug. 27, 1957 |
| 2,839,646 | Hester | June 17, 1958 |
| 2,915,659 | Goodman | Dec. 1, 1959 |
| 3,040,168 | Stearns | June 19, 1962 |
| 3,058,021 | Dunn | Oct. 9, 1962 |

OTHER REFERENCES

Herrington, RCA Technical Note No. 62, December 3, 1957.

Stow: "Fiber Optics and Their Application to Electronic Tubes," Westinghouse Electric Corp., Elmira, New York, September 27, 1960, p. 9.